May 11, 1948.  G. HOHWART ET AL  2,441,414
DRILL PRESS
Filed Oct. 27, 1945  3 Sheets-Sheet 2
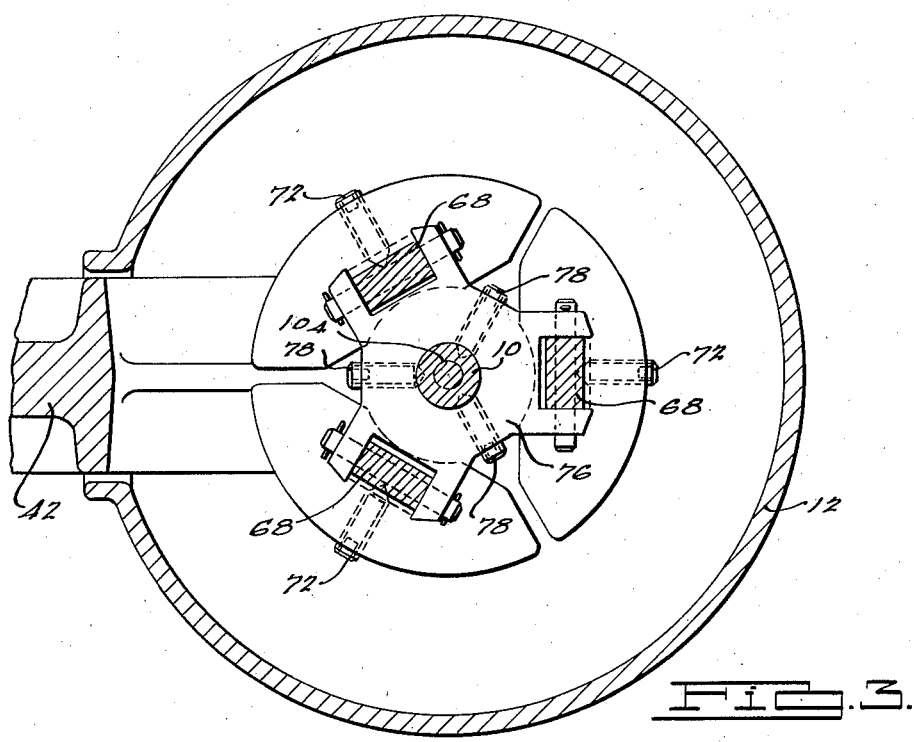
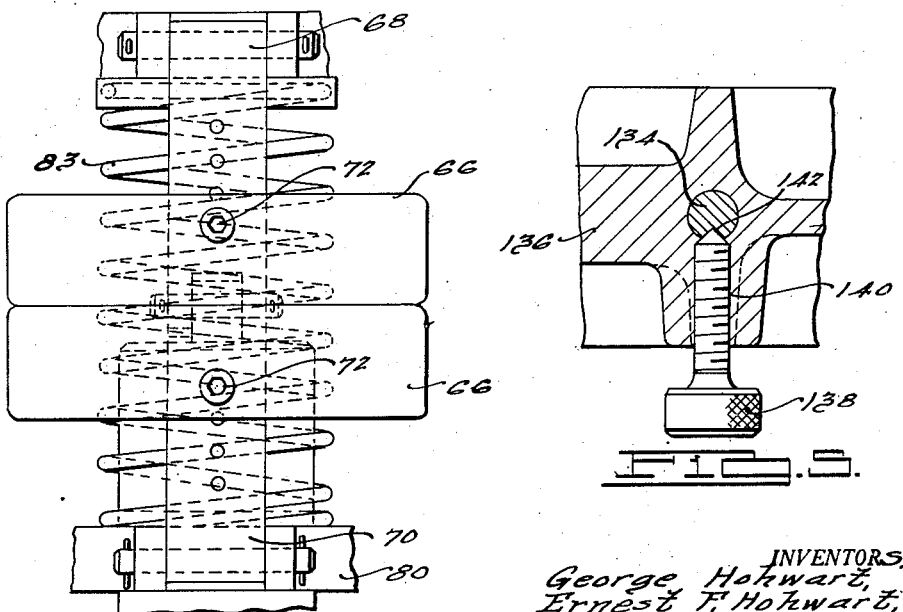
INVENTORS.
George Hohwart,
Ernest F. Hohwart,
Paul A. Smith.
BY Harness, Dickey & Pierce.
ATTORNEYS.

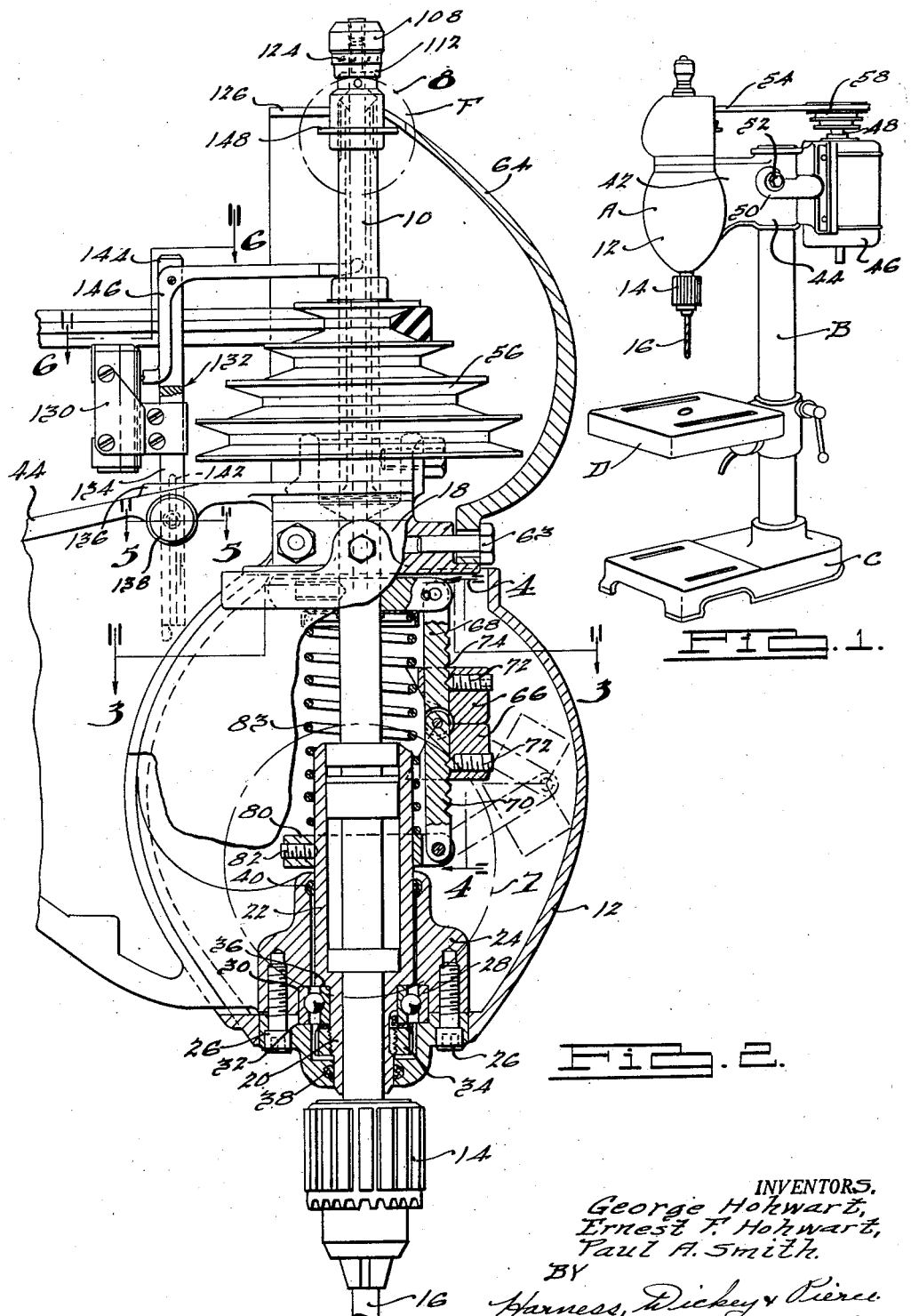

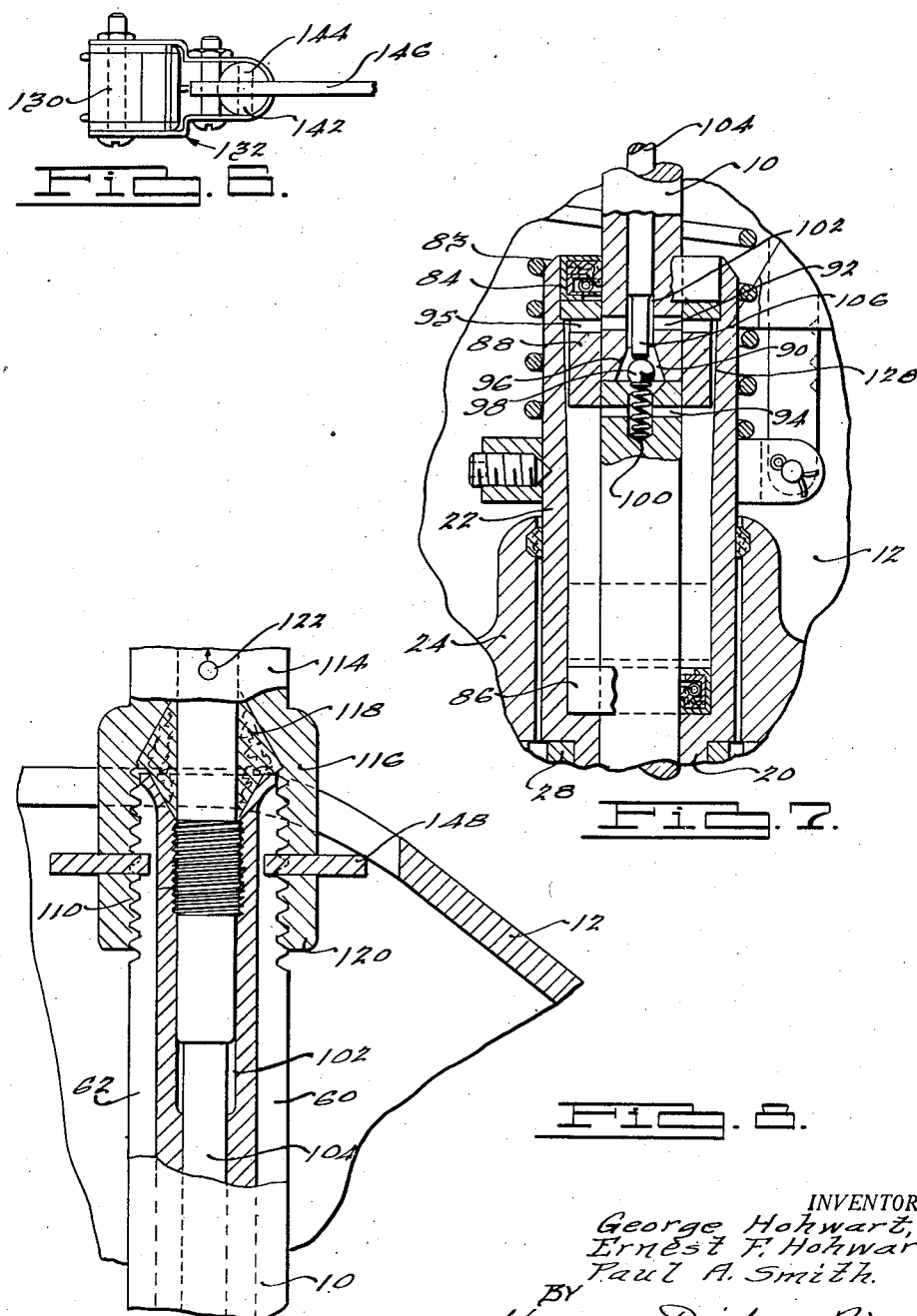

Patented May 11, 1948

2,441,414

UNITED STATES PATENT OFFICE 2,441,414

DRILL PRESS

George Hohwart, Ernest F. Hohwart, and Paul A. Smith, Detroit, Mich., assignors to N. A. Woodworth Company, Ferndale, Mich., a corporation of Michigan Application October 27, 1945, Serial No. 625,022

3 Claims. (Cl. 77—33)

The invention relates broadly to machine tools and more particularly to new and useful improvements in drill presses.

Prior to the instant invention it has been conventional practice to move the drill toward a workpiece by centrifugally operated mechanism. Although widely used and otherwise highly efficient the centrifugally operated actuator mechanism is faulty in that excessive breakage of tools occurs at the end of the drilling operation. In tools of this character, the drill is advanced with considerable force and the shock or jolt which results when the drill breaks suddenly through the workpiece causes it to break.

An important object of the present invention, therefore, is to provide a centrifugally operated drill press in which the forward movement of the drill is controlled so that very little shock or jolt results when it breaks through the workpiece at the end of the drilling operation.

Another object of the invention is to provide a drill press of the above-mentioned character in which the drill is automatically returned to the initial or starting position when the drilling operation is completed.

Still another object of the invention is to provide a drill press of the above-mentioned character in which the speed at which the drill is rotated and advanced can be easily varied to meet the requirements of different types of materials and of different operations to be performed thereon.

Yet another object of the invention is to provide a drill press of the above-mentioned character in which advancement of the drill is controlled by a readily accessible manual actuator.

A further object of the invention is to provide a drill press of the above-mentioned character in which the distance the drill is advanced can be controlled by a novel and readily accessible mechanism.

A still further object of the invention is to provide a drill press of the above-mentioned character in which predetermined and approximately constant pressures are exerted on the tool by the centrifugally operated mechanism.

A yet further object of the invention is to provide an actuator mechanism that is inexpensive to manufacture, positive in operation and adapted for convenient utilization in all types of automatic machines in which it is desired to advance a rotating tool to a predetermined point and then return the tool to its initial position.

Other objects and advantages of the invention will be apparent during the course of the following description.

In the drawings forming a part of this specification and wherein like numerals are employed to designate like parts throughout the same, Figure 1 is a perspective view of a drill press embodying the invention, Fig. 2 is an enlarged side view, partly in section and partly in elevation, of the drilling head, Fig. 3 is an enlarged, transverse sectional view taken on the line 3—3 of Fig. 2, Fig. 4 is an enlarged, fragmentary, vertical sectional view taken on the line 4—4 of Fig. 2, Fig. 5 is an enlarged, fragmentary, transverse sectional view taken on the line 5—5 of Fig. 2, Fig. 6 is a fragmentary, transverse sectional view taken on the line 6—6 of Fig. 2, Fig. 7 is an enlarged view of the portion of Fig. 2 enclosed by the circle 7, parts thereof being broken away and shown in section for clearness of illustration, and Fig. 8 is an enlarged, fragmentary view of the portion of Fig. 2 enclosed by the circle 8, parts thereof being broken away and shown in section to more clearly illustrate the mechanism.

Considered in certain of its broader aspects the invention comprises a drilling head mounted in the conventional manner on a suitable support or standard. The drilling head includes a rotatable and reciprocable spindle, means for rotatably driving the spindle, means for advancing or projecting the spindle at approximately a constant pressure and at a predetermined speed, and mechanism for limiting the distance the spindle is advanced.

The spindle preferably is rotatably driven by an electric motor and, in order to vary the speed at which the spindle is rotated, both the motor and the spindle are provided with step pulleys. This mechanism provides a convenient means for rotatably driving the spindle at various predetermined speeds; however, any suitable means for rotating the spindle is contemplated and within the scope of the instant invention.

In the embodiment of the invention here shown the mechanism for advancing the spindle axially toward the workpiece comprises pivoted weights mounted in such a way that rotation of the spindle causes the weights to fly outwardly and exert projective pressure thereagainst. These weights preferably are adjustably mounted so that the axial pressure exerted on the spindle can be regulated.

The rate at which the spindle is projected is controlled hydraulically by connecting the spindle to a piston and mounting the latter in a suitable oil chamber or cylinder. A valve controlled bypass is provided to establish communication between the ends of the cylinder at opposite sides of the piston and the valve is adjusted manually by a suitable actuator mounted on the spindle. By manipulating the actuator, the size of the valve opening can be varied to control the flow of fluid therethrough and, consequently, to control the rate at which the fluid is displaced across the piston. Since the spindle and piston are coaxial, the latter also controls the rate at which the spindle is projected. In practice, it is preferred that the spindle extend through the oil chamber and that the piston be attached directly thereto since this construction is simple yet rugged and highly efficient in operation.

It will be readily appreciated that the hydraulic unit maintains a column of oil ahead of the piston and that this oil sustains the sudden increase in load which results when the drill breaks through the workpiece. This mode of operation substantially eliminates breakage of the drill at the end of the drilling operation. Moreover, the unit maintains a uniform forward movement of the drill and spindle during the drilling operation.

The stroke or traverse of the spindle is regulated by a limit switch in circuit with the motor which rotatably drives the spindle. The limit switch is mounted for adjustment relative to a stop on the spindle and can thus be selectively positioned to regulate the axial movement of the latter.

As the spindle advances it compresses a spring. When the limit switch shuts off the motor, the centrifugally operated weights are rendered ineffective and the compressed spring acts automatically to return the spindle to its initial or starting position.

For a more detailed description of the invention reference is had to the accompanying drawings and particularly to Fig. 1 wherein the drilling head A is shown attached at the upper end of a vertical column B mounted on a suitable base C. A workpiece supporting table D carried by the column B below the drilling head is vertically adjustable to selectively position a workpiece with respect to the latter.

Generically speaking, these parts are old in the art and are combined and correlated in the conventional manner. A suitable workpiece is placed on the table D and mechanism in the drilling head A is adapted to advance a rotatably driven drill or the like toward the workpiece.

As suggested, the instant invention is concerned primarily with the drilling head and attention is now directed to Fig. 2 which shows this portion of the drill press in detail. A rotatable and reciprocable spindle 10 extends vertically through a housing 12 and the projecting lower end thereof is equipped with a suitable chuck 14 adapted to receive a drill 16 in the conventional manner.

The spindle 10 is supported at the top of the housing 12 by a bearing 18 and at the bottom of the housing by the downwardly extending shank portion 20 of a hydraulic cylinder 22. The latter is vertically stationary but rotatable with the spindle and disposed in a bearing housing 24 which is attached to the bottom of the housing 12 by screws 26. The shank 20 extends through and is rotatably supported by a roller bearing 28 the outer race of which seats in registering internal angular recesses 30 and 32 provided in the bearing housing 24 and the bottom of housing 12 and the inner race of which is confined between a lock nut 34 and a radial shoulder 36 on the hydraulic cylinder 22. Sealing rings 38 and 40 positioned around the shank 20 and cylinder 22 below and above bearing 28 provide fluid-tight joints and retain lubricant around the bearing.

The housing 12 includes an integral, laterally extending web 42 which terminates in a vertical sleeve 44. The latter surrounds the upper portion of the column B and is connected thereto by a set screw, or the like (not shown). A motor 46 having a vertically extending drive shaft 48 is attached to the column B behind the housing A by forwardly extending arms 50 and bolts 52. A driving connection is established between the motor 46 and spindle 10 by an endless belt 54 which extends around the pulleys 56 and 58 carried by the spindle 10 and driveshaft 48, respectively. These pulleys are preferably the so-called step or cone type so that the spindle 10 can be rotatably driven at different predetermined speeds. Pulley 56 surmounts housing 12 and is provided with inwardly extending keys which enter keyways 60 and 62 in the spindle 10.

Attached to the housing 12 by bolts 63 is a shield 64 which extends in front and at both sides of the pulley 56 to protect a person using the device from contact with the pulley or in the event belt 54 breaks.

As will be readily understood the keyways 60 and 62 rotatably connect spindle 10 and pulley 56 but permit the former independently to move axially through the pulley. Thus, when motor 46 is energized, the spindle 10 is constantly rotated at a speed determined by the position of endless belt 54 on the step pulleys 56 and 58. While being rotatably driven in this manner the spindle 10 can move axially to advance or retract drill 16 relative to a workpiece supported by the table D.

Feeding means in the form of centrifugally operated weights 66 are provided for exerting projective pressure upon the spindle 10. In the form of the invention here shown, three sets of weights 66 are provided in substantially equi-spaced relation around the spindle; however, any desired number of weights that can be mounted conveniently within the housing may be used. Each set of weights comprises a pair of vertically disposed, pivotally connected arms 68 and 70 which carry the weights 66, as best shown in Fig. 2. The latter are slidably associated with the arms and are held in a selected adjusted position thereon by set screws 72 which enter sockets or indentations 74 provided in the outer surfaces of the arms. At their distal ends the arms 68 are pivoted to a spider 76 securely attached to the spindle 10 immediately below the bearing 18 and the arms 70 are pivotally attached to a collar 80 carried by the hydraulic cylinder 22 and attached thereto by a set screw 82. A coil spring 83 confined between the spider 76 and collar 80 normally urges the spindle 10 upwardly to retract the drill 16.

It will be observed that, when the spindle 10 is fully retracted, arms 68 and 70 are straightened, as shown by the full lines in Fig. 2. However, when the spindle 10 is rotatably driven, the weights 66 are thrown outwardly by centrifugal force to the position shown by dot and dash lines in Fig. 2. When the weights move to this position arms 68 and 70 advance the spindle 10 and move the drill 16 toward the workpiece. Manifestly, when weights 66 are positioned together and adjacent the pivot which connects arms 68 and 70, they generate a maximum feeding pressure upon the spindle 10 and the feeding pressure can be reduced progressively by moving the weights outwardly on the arms. This adjustment can be made easily by first unscrewing set screws 72, sliding weights 66 to the desired position on the arms and then tightening the set screws.

According to the present invention advancement of the spindle 10 is controlled hydraulically. It will be observed that the spindle extends axially through the hydraulic cylinder 22 and that the upper and lower ends of the latter are closed and rendered fluidtight by sealing rings 84 and 86. A piston 88 attached to and movable with the spindle 10 is mounted to reciprocate within the cylinder 22. When spindle 10 is retracted the piston 88 is disposed at the top of the cylinder 22 and the latter is of sufficient length to accommodate the piston during the full traverse of the spindle.

Cylinder 22 is filled with oil or other hydraulic fluid and the speed at which the spindle advances is governed by the rate at which fluid is displaced across the piston 88 through a valve controlled by-pass. The by-pass comprises a valve chamber 90 in the portion of spindle 10 which extends through piston 88 and laterally extending passages 92 and 94 which provide communication between the valve chamber and the cylinder above and below the piston. The upper passages 92 preferably open into channels or slots provided in the top of piston 88 so that the passages will not be closed by the top of the cylinder when the piston is in the raised position. Chamber 90 includes an upwardly tapered portion 96 which defines a valve seat and a ball valve 98 is normally urged upwardly against the seat by a coil spring 100 to close the by-pass. From the foregoing it will be readily apparent that, when piston 88 wipingly engages the cylinder wall, spindle 10 can advance only as fast as liquid below the piston is displaced through the by-pass and that the rate of liquid displacement is determined by the distance valve 98 is spaced from its seat.

In order to selectively position valve 98 with respect to its seat an axial passage 102 is provided in the spindle 10 above the valve chamber 90. Passage 102 opens through the top of spindle 10 and slidably accommodates a valve stem 104. At its lower end valve stem 104 is provided with a longitudinal extension 106 of relatively small diameter which extension is adapted to engage the ball valve 98, and at its upper end valve stem 104 extends above the spindle 10 and carries an actuator thimble or knob 108. As best shown in Fig. 8 the valve stem 104 is threadedly connected to the spindle 10 at 110 and the knob 108 is fixed thereon. Thus, rotation of the knob 108 rotates the valve stem and, by reason of its threaded connection with the spindle, moves the stem axially to selectively position the ball valve 98 with respect to its seat. Knob 108 is provided with a depending skirt portion 112 which telescopes the restricted upper portion 114 of a packing nut 116 threaded on the upper end of spindle 10. Packing 118 is compressed by the nut 116 in the conventional manner to seal the joint between spindle 10 and valve stem 104 and the nut is fixed on the spindle by a lock nut 120. It will thus be apparent that the actuator knob 108 rotates relative to the packing nut 116. An indicator mark 122 is therefore provided on the latter and correlated with suitable indicia 124 on the thimble to indicate the position of ball valve 98.

In practice, the knob 108 is adjusted to selectively position the ball valve 98 before the motor 46 is energized. This adjustment then controls the rate at which fluid can be displaced across the piston 88. Thus drill 16 is advanced at a constant speed and the speed is determined by the initial setting of knob 108. In this connection it will be observed that the valve stem 104 extends upwardly through a slot 126 in guard 64 so that the actuator knob 108 is readily accessible for adjustment. This arrangement makes it possible to control the valve 98 manually from the top of spindle 10 and the arrangement is such that the adjustment can be easily and quickly made by the operator.

In order to provide a rapid traverse for drill 16 the upper portion of cylinder 22 is flared slightly as at 128. Thus, during the initial advancement of spindle 10 an annular space is provided between the piston 88 and cylinder 22 through which fluid is displaced. Since fluid is also displaced through the by-pass in the piston during this portion of its travel, the spindle is advanced relatively rapidly. However, as the flared portion 128 merges with the cylindrical lower portion of the cylinder, fluid displacement is progressively limited to flow through the by-pass. As suggested, when piston 88 enters the cylindrical lower portion of the cylinder it wipingly engages therewith to limit fluid displacement entirely to the by-pass so that the speed at which the spindle advances is then controlled by the position of valve 98.

It will be readily appreciated that a quick return is provided for the drill 16 since fluid is displaced rapidly by forcing ball valve 98 downwardly against the action of spring 100 to a wide open position. Thus, the ball valve 98 is forced away from its seat and valve stem 104 by hydraulic action of the fluid and the spindle 10 is retracted independently of the valve control means.

In order to limit the stroke or axial movement of drill 16, a limit switch 130 is connected in circuit with the motor 46. The limit switch 130 is mounted on a suitable bracket 132 which includes a downwardly extending stem portion 134. Stem 134 is slidably mounted in a bearing 136 provided in the top portion of web 44 and is held in a selected adjusted position by a manually operated thumbscrew 138. As best shown in Fig. 5, the thumbscrew extends through a lateral internally threaded opening 140 in bearing 136 and its inner end seats in a vertical groove 142 provided in stem 134. When the set screw 138 is loosened, bracket 132 can be vertically adjusted in bearing 136 and can be held in the properly adjusted position merely by tightening the thumbscrew against stem 134.

Bracket 132 also includes a pair of laterally spaced upwardly extending arms 144 between which the actuator arm 146 of limit switch 130 is pivoted. As best shown in Fig. 2, the distal end of actuator arm 146 is disposed adjacent to the spindle 10 and in the path of a stop member 148 carried thereby. Stop member 148 is here shown in the form of a washer confined between packing nut 116 and lock nut 120 (Fig. 8). Thus, when bracket 132 is adjusted actuator arm 146 is moved relative to washer 148.

When drill 16 is advanced toward the workpiece, washer 148 approaches the actuator arm 146 and when it engages therewith limit switch 130 is operated to shut off motor 46. As soon as motor 46 ceases to drive spindle 10 the centrifugally operated weights 66 are rendered ineffective and spring 83 quickly retracts the spindle to the initial or starting position.

It is to be understood that the form of the invention herewith shown and described is to be taken as a preferred example of the same and that various changes in the size, shape and arrangement of parts may be resorted to without departing from the spirit of the invention or the scope of the appended claims.

Having thus described the invention, we claim:

1. In a drill press, a support; a rotatable and reciprocable spindle carried by the support and adapted to move a cutting tool relative to a workpiece; means for rotatably driving said spindle; mechanism including centrifugally operated weights for moving said spindle axially toward the workpiece; and hydraulic means for controlling the rate at which the spindle is moved toward the workpiece, said hydraulic means comprising an oil chamber, a piston in said chamber, means connecting the piston to the spindle and means including an adjustable valve member for establishing communication across said piston, the arrangement being such that the spindle advances at a rate established by displacement of oil through said valve member.

2. In a drill press, a support; a rotatable and reciprocable spindle carried by the support and adapted to move a cutting tool relative to a workpiece; means for rotatably driving said spindle; mechanism including centrifugally operated weights for moving said spindle axially toward the workpiece; and hydraulic means for controlling the rate at which the spindle is moved toward the workpiece, said hydraulic means comprising an oil chamber, a piston in said chamber, means connecting the piston to the spindle, means including an adjustable valve member for establishing communication across said piston, and mechanism controlled from said spindle for adjusting the valve member and regulating the rate of fluid displacement across the piston.

3. In a drill press having, in combination, a support; a rotatable and reciprocable spindle carried by the support and adapted to move a cutting tool relative to a workpiece; an electrically operated drive means for rotatably actuating said spindle; a plurality of centrifugally actuated weights for advancing the spindle axially; a manually regulated hydraulic means coactive with the spindle to control the rate at which the latter is advanced; a stop member carried by the spindle; and a switch in circuit with said electrically operated drive means mounted for adjustment relative to said stop member.

GEORGE HOHWART.
ERNEST F. HOHWART.
PAUL A. SMITH.

REFERENCES CITED

The following references are of record in the file of this patent:

UNITED STATES PATENTS

| Number | Name | Date |
|---|---|---|
| 897,676 | Thompson | Sept. 1, 1908 |
| 1,069,995 | Anderson | Aug. 12, 1913 |
| 2,280,115 | Broders et al. | Apr. 21, 1942 |

FOREIGN PATENTS

| Number | Country | Date |
|---|---|---|
| 513,636 | France | Nov. 4, 1920 |